United States Patent [19]

Chan

[11] Patent Number: 5,754,891
[45] Date of Patent: May 19, 1998

[54] MESSAGE CAMERA HAVING SPROCKET WHEEL WHICH ADJUSTS FOR DIFFERENT FILM LENGTHS

[75] Inventor: Yet Chan, Kowloon, Hong Kong

[73] Assignee: Foster Assets Corporation, Hong Kong

[21] Appl. No.: 840,251

[22] Filed: Apr. 14, 1997

[51] Int. Cl.$^6$ .................................................. G03B 35/00
[52] U.S. Cl. .................................................. 396/6; 396/322
[58] Field of Search .................................. 396/6, 315, 316, 396/322, 335–340, 401

[56] References Cited

U.S. PATENT DOCUMENTS

| | | | |
|---|---|---|---|
| 5,187,512 | 2/1993 | Kirkendall | 396/340 |
| 5,546,146 | 8/1996 | Dobbs et al. | 396/6 |
| 5,615,396 | 3/1997 | Craig | 396/6 |

Primary Examiner—Howard B. Blankenship
Attorney, Agent, or Firm—Samuels, Gauthier, Stevens & Reppert

[57] ABSTRACT

A disposable camera having a body which provides a film take-up chamber for containing an initially empty film cartridge, an exposure chamber having an open rear side, and a film supply chamber for containing a film roll pre-exposed with messages on respective frames for subsequent photographic exposure. The camera includes a shutter mechanism to enable photographic exposure, a film-advancing member for moving the film from the film supply chamber to the film take-up chamber across the rear side of the exposure chamber, and an operating mechanism. The operating mechanism includes a sprocket for engaging traction holes of the film extending across the rear side of the exposure chamber for activating the overall operating mechanism upon said movement of the film. The sprocket is formed by an external toothed wheel and an internal member which are co-axially rotatable relative to each other and provided with respective formations which are angularly engageable with each other in only one direction and at a single relative orientation between said wheel and member.

7 Claims, 10 Drawing Sheets

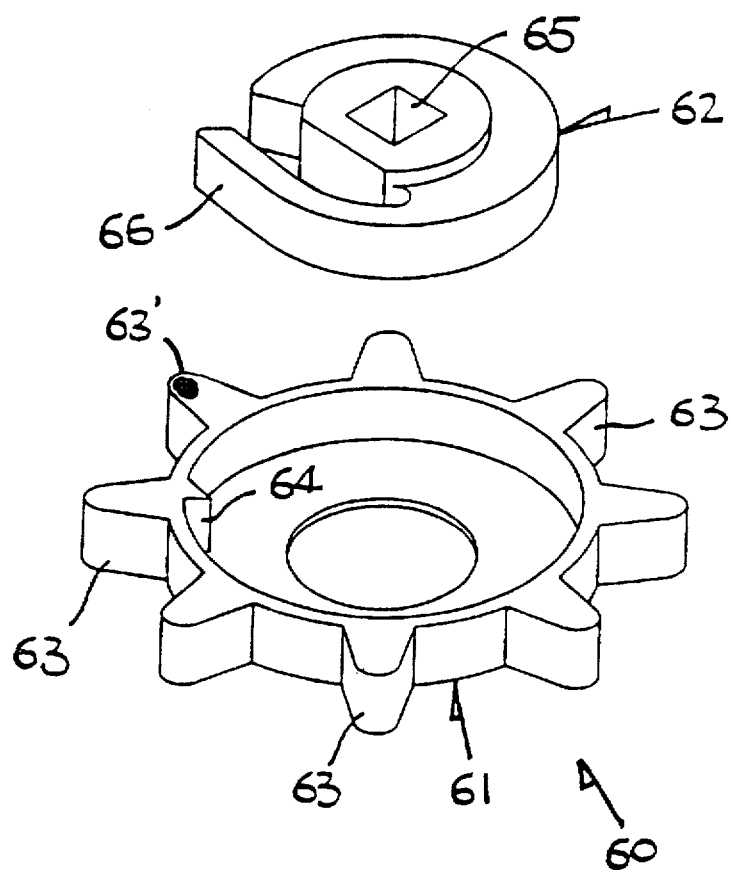
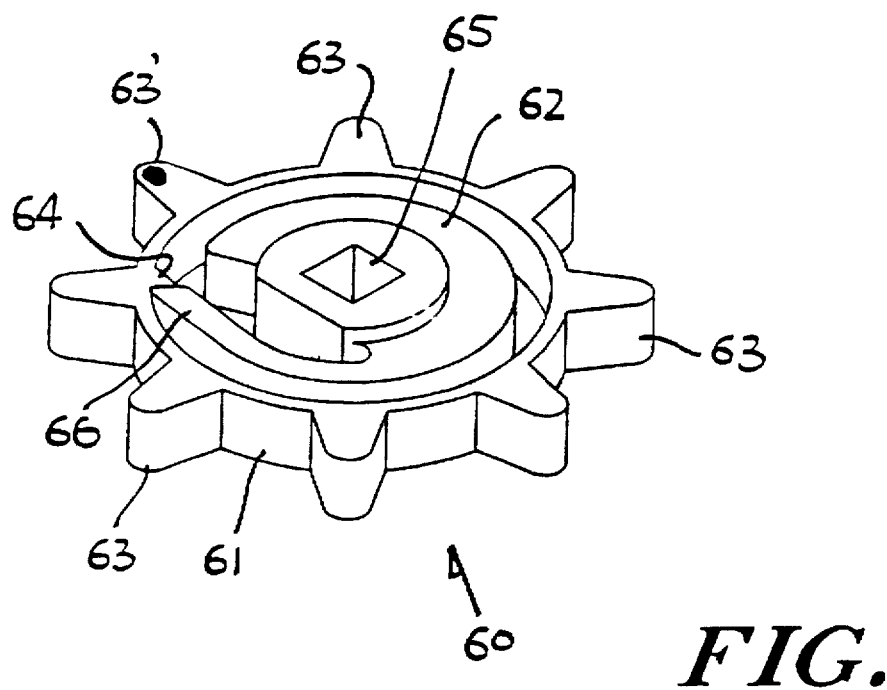
FIG. 4

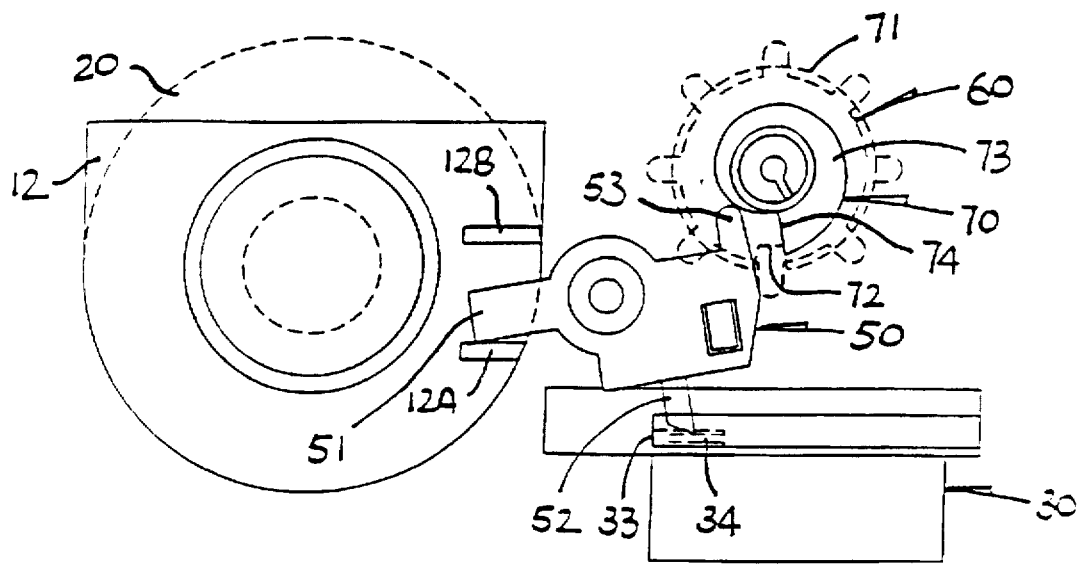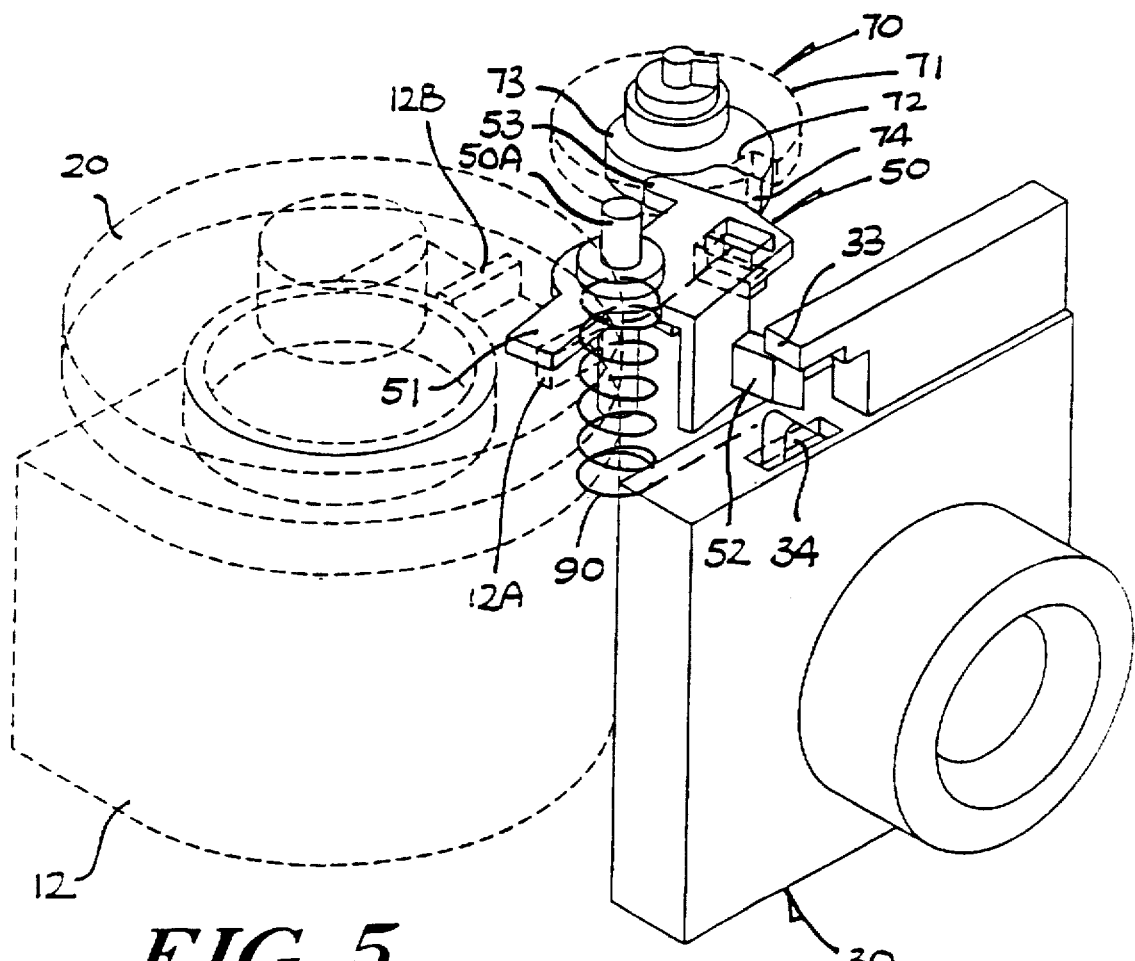
FIG. 5

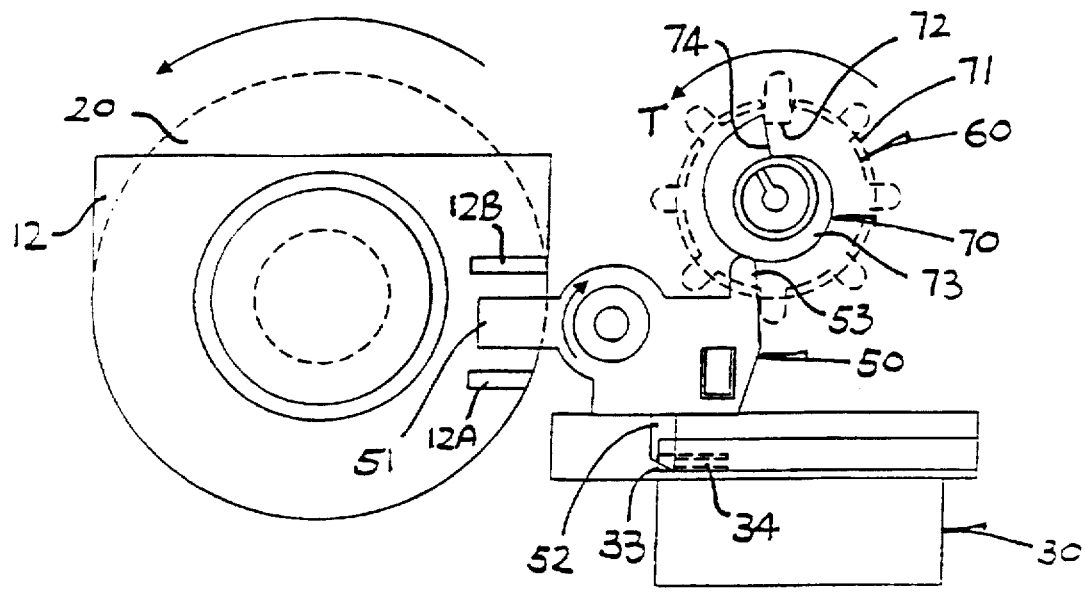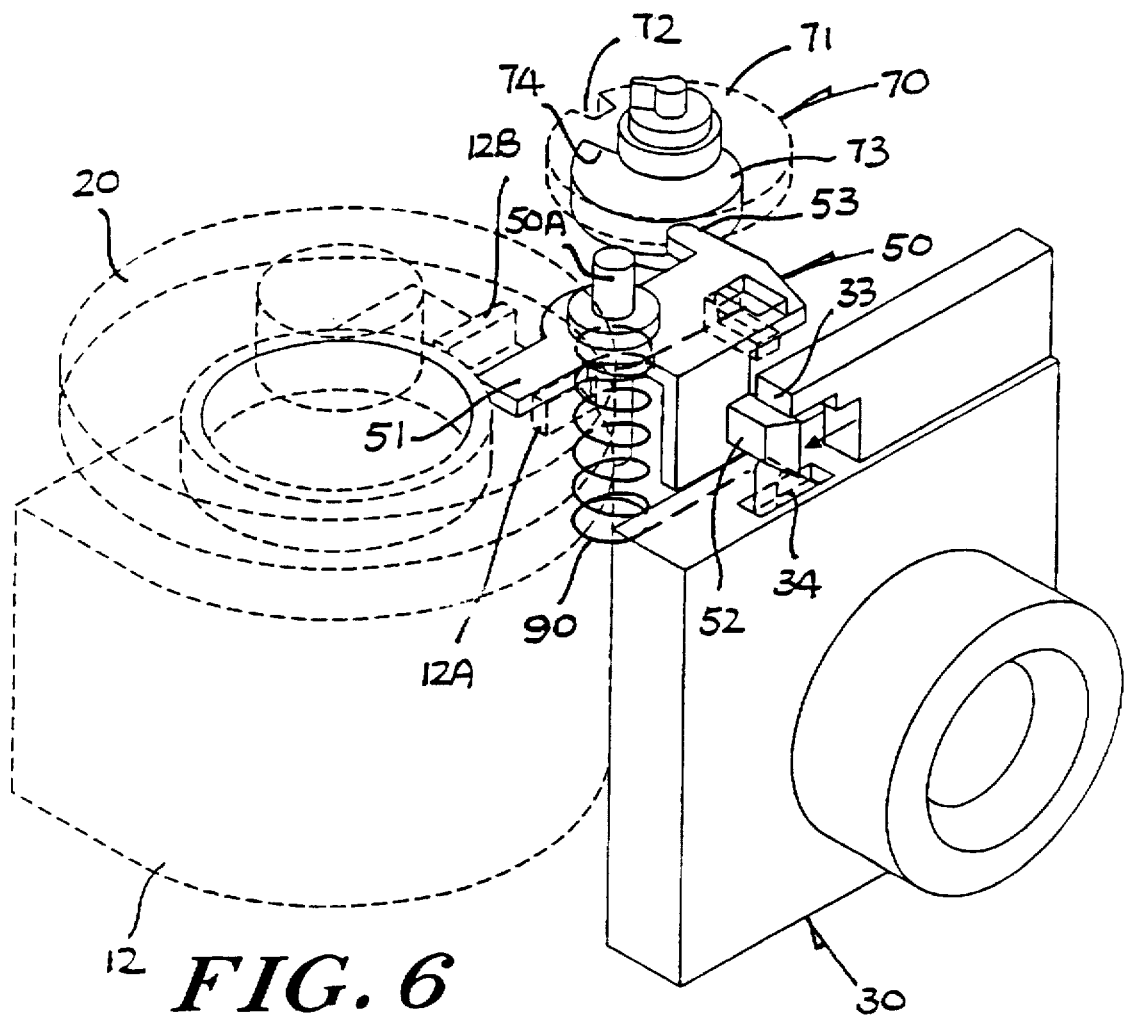
FIG. 6

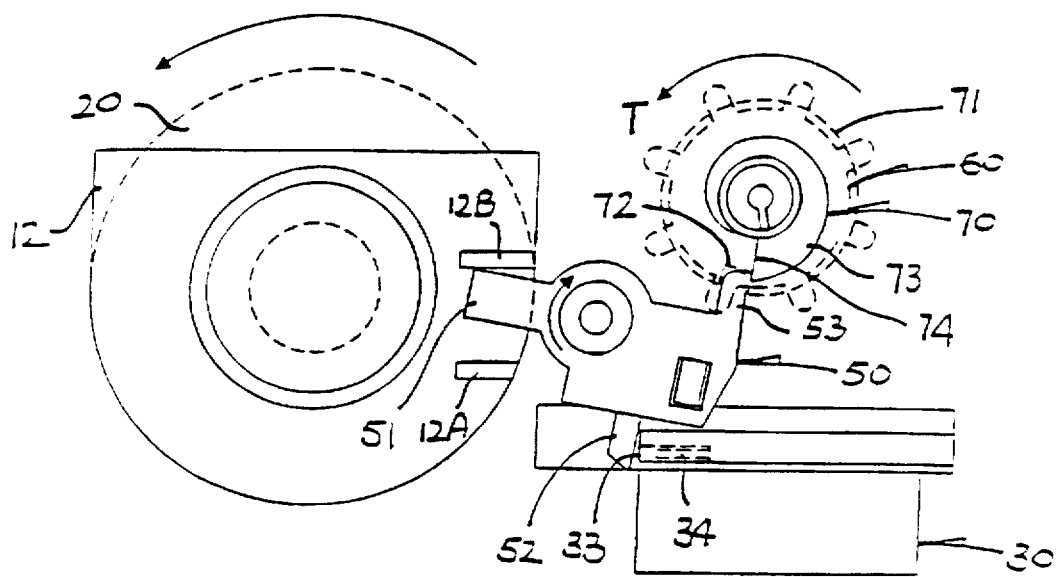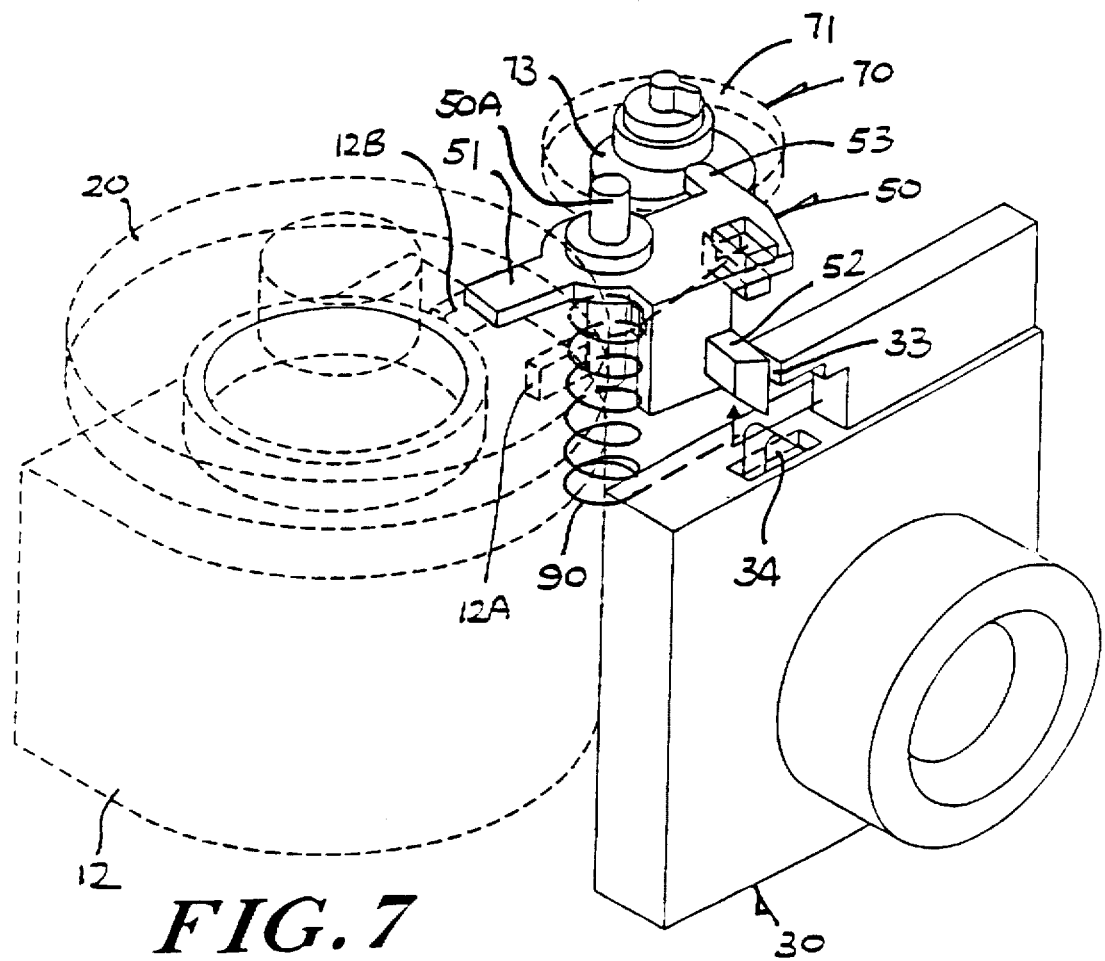
FIG. 7

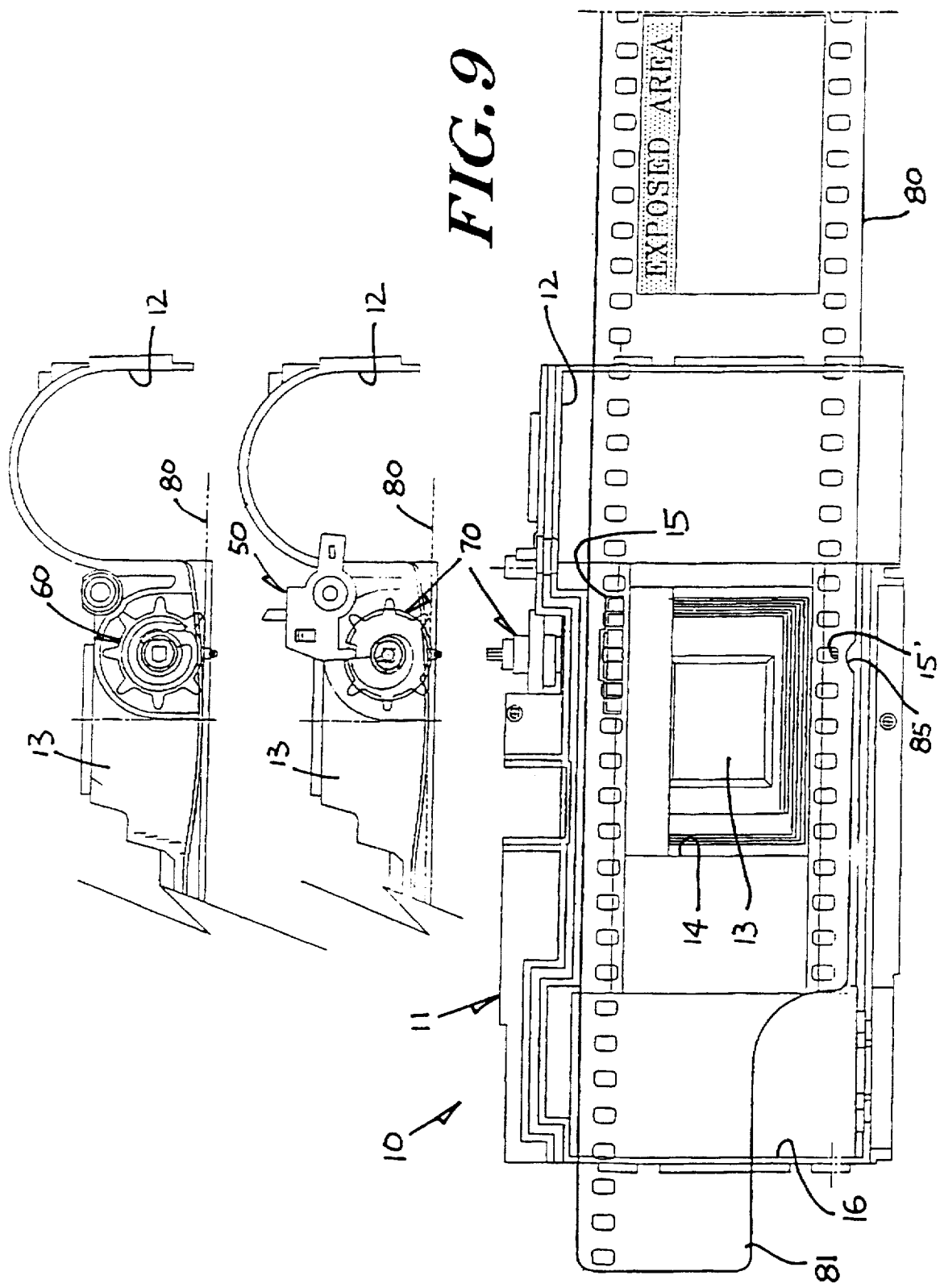

5,754,891

1

MESSAGE CAMERA HAVING SPROCKET WHEEL WHICH ADJUSTS FOR DIFFERENT FILM LENGTHS

The present invention relates to a disposable camera which uses a roll of film pre-exposed with messages on respective exposure frames.

SUMMARY OF THE INVENTION

According to the invention, there is provided a disposable camera having a body which provides a film take-up chamber for containing an initially empty film cartridge, an exposure chamber having an open rear side, and a film supply chamber for containing a film roll pre-exposed with messages on respective frames for subsequent photographic exposure, and including a shutter mechanism to enable photographic exposure, a film-advancing member for moving the film from the film supply chamber to the film take-up chamber across the rear side of the exposure chamber, and an operating mechanism which includes a sprocket for engaging traction holes of the film extending across the rear side of the exposure chamber for activating the overall operating mechanism upon said movement of the film, wherein the sprocket is formed by an external toothed wheel and an internal member which are co-axially rotatable relative to each other and provided with respective formations which are angularly engageable with each other in only one direction and at a single relative orientation between said wheel and member.

Preferably, the formation of the sprocket wheel is in the form of a projection for engaging with the formation of the sprocket member in said only one direction.

It is preferred that the formation of the sprocket member is resiliently biassed to engage with the formation of the sprocket wheel in said only one direction.

In a preferred embodiment, the formation of the sprocket wheel is in the form of an asymmetrical triangular tooth.

In a preferred embodiment, the formation of the sprocket member is in the form of an arcuate peripheral finger.

Preferably, the sprocket member is substantially in the form of a disc.

It is preferred that the formation of the sprocket wheel is provided to extend for an approximate angle of 10° with respect to the centre.

BRIEF DESCRIPTION OF DRAWINGS

The invention will now be more particularly described, by way of example only, with reference to the accompanying drawings, in which:

FIG. 4 consists of two perspective views showing two parts of the sprocket of FIG. 2 separated and combined, respectively;

FIG. 5 consists of top plan and front perspective views of the internal components of FIG. 2, in a normal condition;

FIG. 6 consists of top plan and front perspective views of the internal components of FIG. 2, in an intermediate condition;

2

Figure 1:
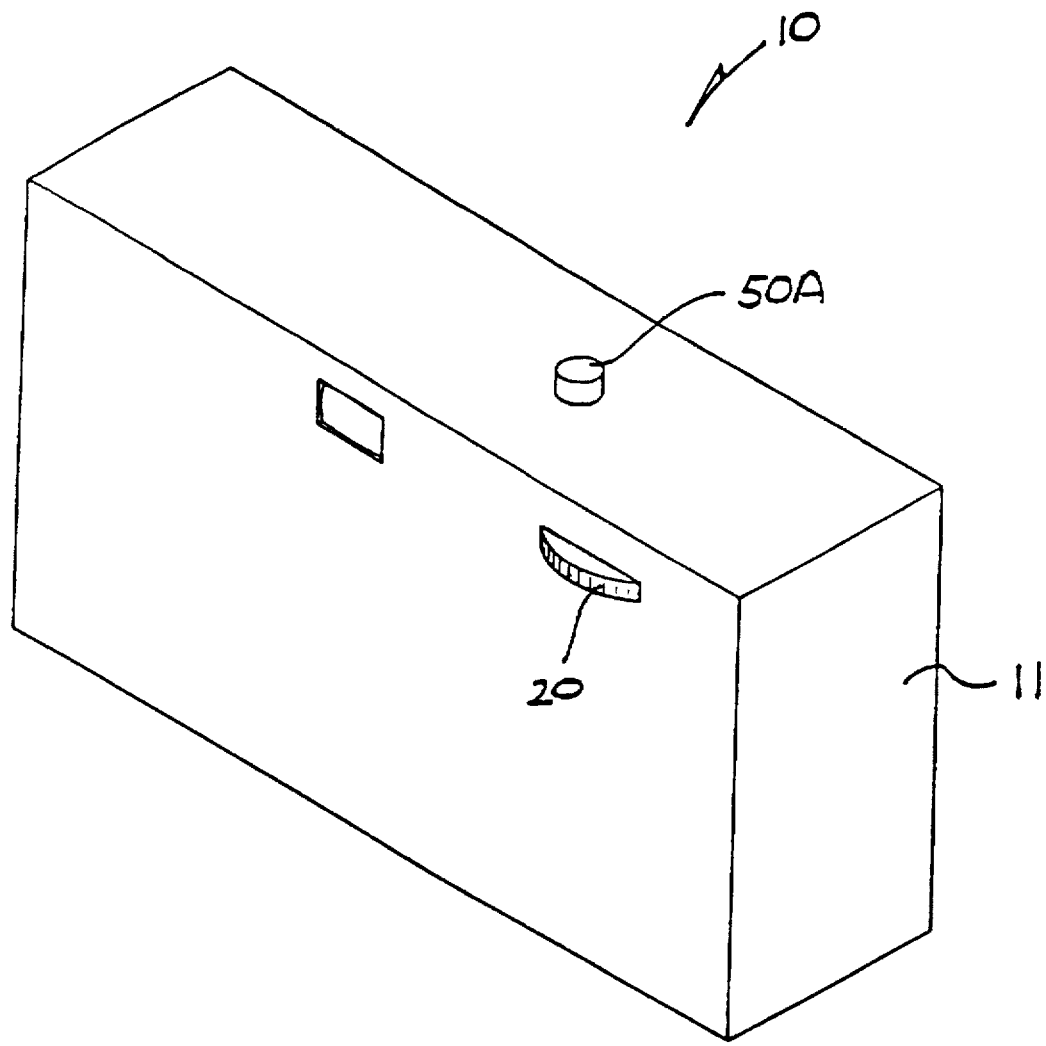
FIG. 1 is a rear perspective view of an embodiment of a disposable camera in accordance with the invention.
Figure 2:
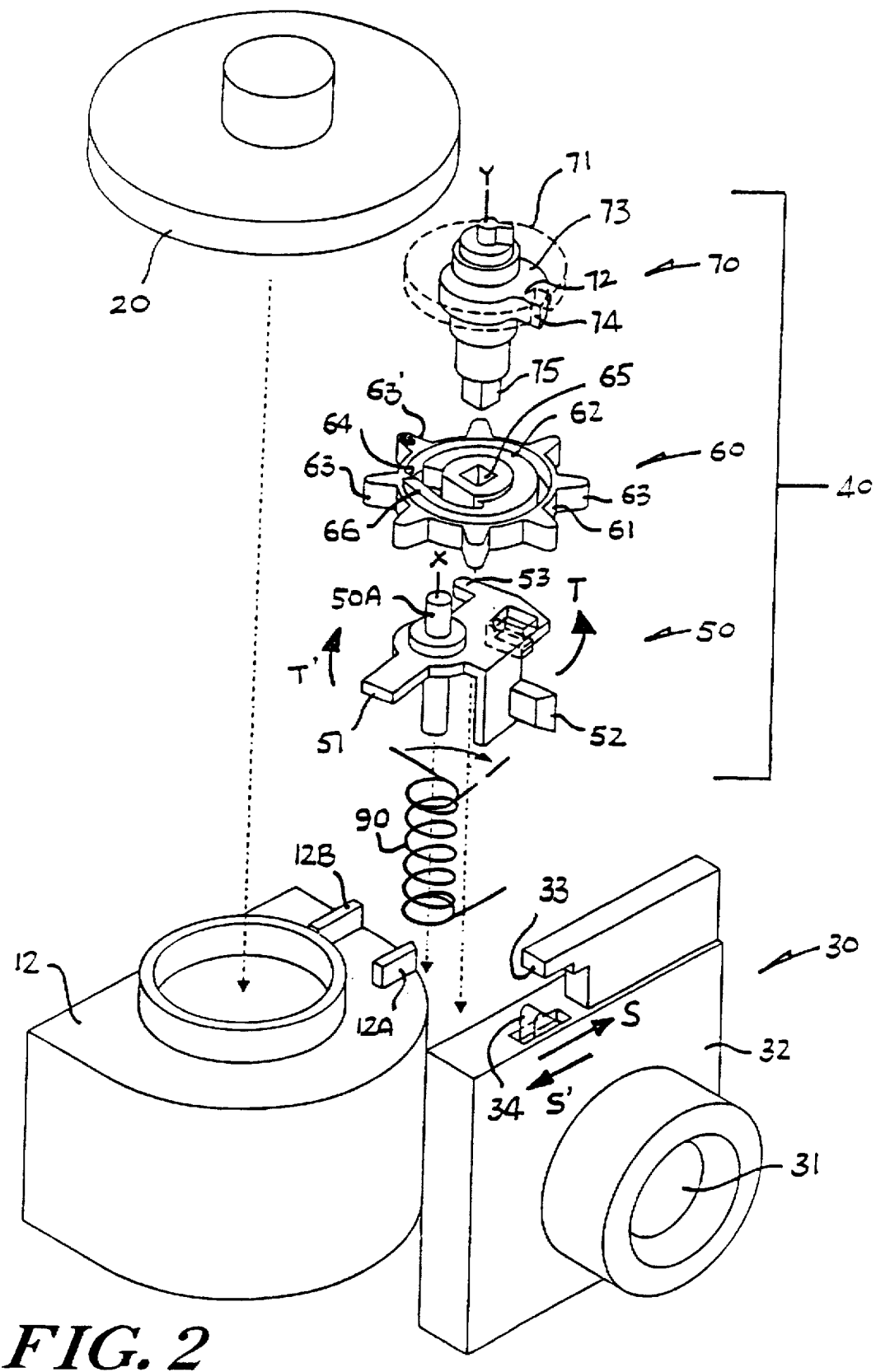
FIG. 2 is an exploded perspective view of certain internal components, including a sprocket and a cam, of the camera of FIG. 1.
Figure 3:
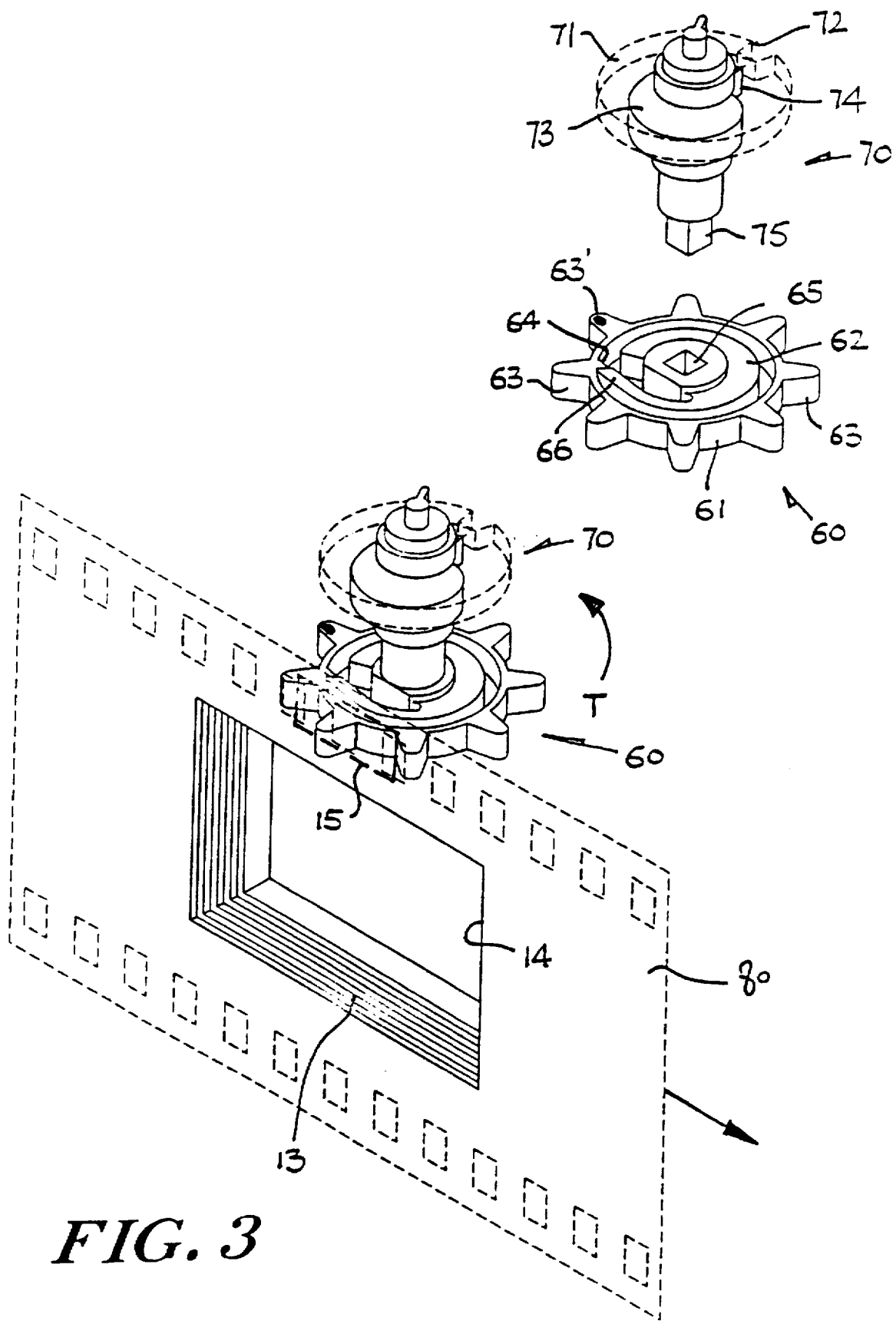
FIG. 3 consists of two perspective views showing the sprocket and cam of FIG. 2 separated in isolation and combined in operation with a film, respectively.
Figure 8:
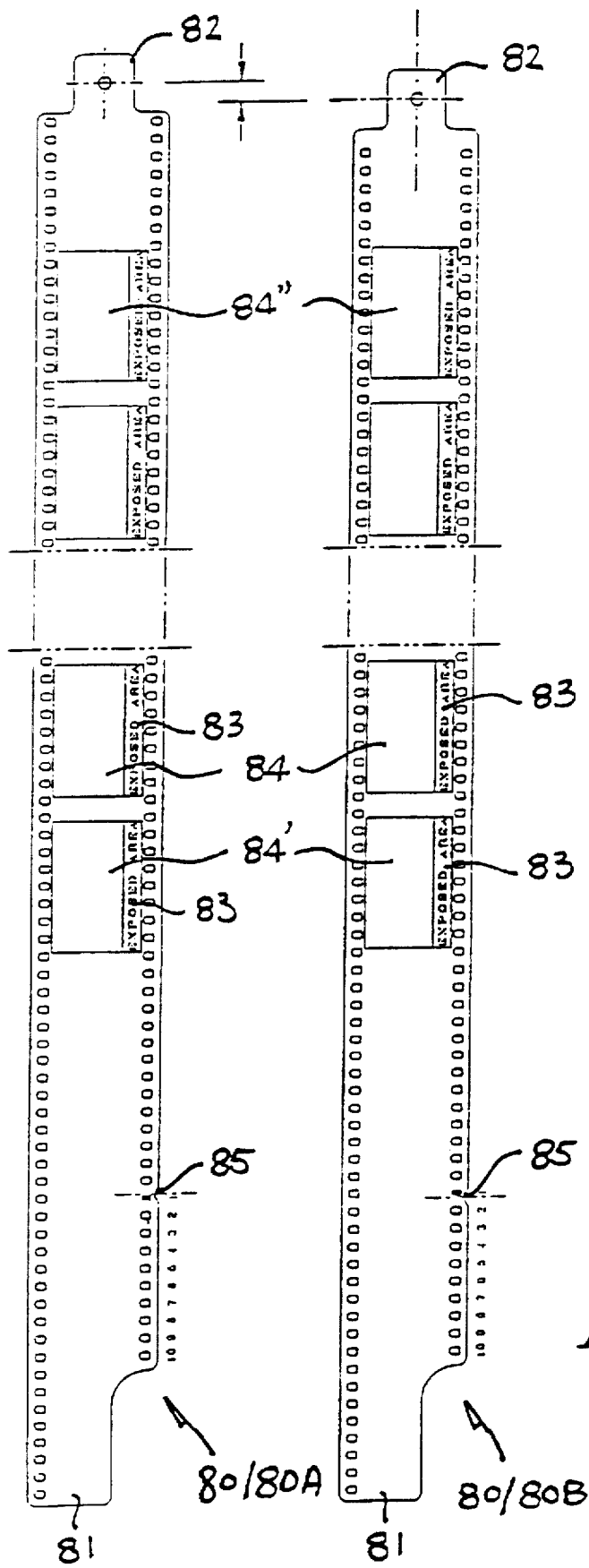
Figure 10A:
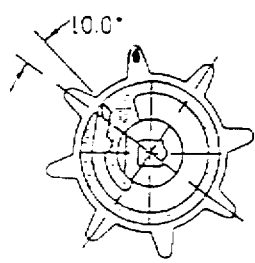
Figure 10B:
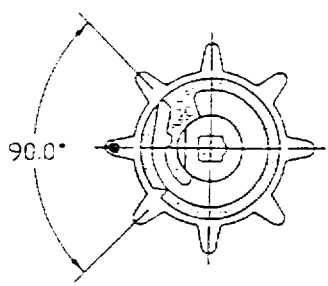
Figure 10C:
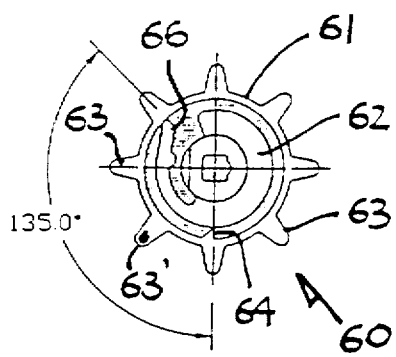
Figure 10D:
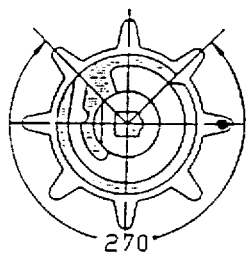
Figure 10E:
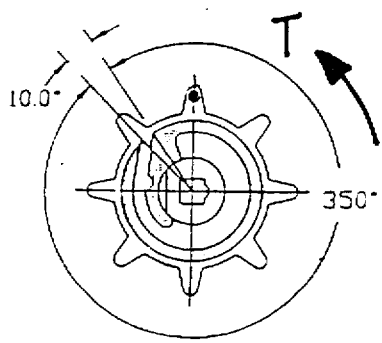

FIG. 7 consists of top plan and front perspective views of the internal components of FIG. 2, in a ready-to-shoot condition;

FIG. 8 shows two strips of film for use with the camera of FIG. 1;

FIG. 9 consists of two top plan and one rear views of the internal components of FIG. 7, in the same condition; and FIG. 10 shows the two parts of the sprocket of FIG. 4 in five different relative angular positions.

DETAILED DESCRIPTION OF PREFERRED EMBODIMENT

Referring firstly to FIGS. 1 to 4 of the drawings, there is shown a disposable camera 10 embodying the invention, which camera 10 has a body 11 providing a right-side film take-up chamber 12 for containing an initially empty standard 35 mm film cartridge, a central exposure chamber 13 having a rectangular rear opening 14, and a left-side film supply chamber 16 (FIG. 9) for containing a 35 mm film roll wound on a spool. In use, a strip 80 of film from the film roll extends across and thus closing the rear opening 14 of the exposure chamber 13, for photographic exposure. A film-advancinig wheel 20 is provided atop the film take-up chamber 12, which is in co-axial engagement with the spool of the film cartridge, for normal film advance by a user from the film supply chamber 16 to the film take-up chamber 12. The camera 10 includes a shutter assembly 30 and an operating mechanism 40, which assembly 30 incorporates a lens 31 directly in front of the exposure chamber 13.

The shutter mechanism 30 has a flat vertical casing 32 which provides an uppermost horizontally-extending hook 33 and contains an internal spring-loaded shutter plate (not shown). The shutter plate has an upper end 34 exposed out of the casing 32 at a position directly below the hook 33. The shutter plate is pivotable, when the end 34 is stroked in direction S, to momentarily open an exposure aperture behind the lens 31 to permit photographic exposure on the film strip 80 through the exposure chamber 13.

The operating mechanism 40 is formed by a striker 50 pivotable about a vertical axis X and an assembly of a sprocket 60 and a cam 70 rotatable about a common vertical axis Y. The striker 50 has a top end 50A and three radial projections 51, 52 and 53 and is resiliently biassed to move upwards and turn in direction T by a bottom co-axial coil spring 90 (FIG. 5). Turning of the striker 50 is restricted by its first projection 51 being confined between a front stop 12A (for acting against the spring 90 as shown in FIG. 5) and a rear stop 12B, both provided on the film take-up chamber 12. The second projection 52 is normally engaged by the hook 33 at a position immediately below it, against the action of the spring 90, and past the end 34 of the shutter plate in direction S, where it is not ready to stroke the shutter plate end 34 for opening the exposure aperture (FIG. 5). The third projection 53 is provided for engagement by the cam 70 to turn the overall striker 50 in opposite direction T' against the spring 90 (FIGS. 6 and 7).

The sprocket 60 is provided for activating the overall operating mechanism 40 and formed by an external toothed wheel 61 and an internal disc 62 which are co-axially rotatable relative to each other. The sprocket wheel 61 has eight equi-angularly spaced outer teeth 63 including a marked tooth 63' and a single asymmetrical triangular inner tooth 64. The sprocket disc 62 has a central square aperture 65 and an arcuate peripheral finger 66 extending in direction T'. The finger 66 bears with its outer side resiliently against the inner periphery of the sprocket wheel 62 such that it can only abut with or catch the asymmetrical tooth 64 in one direction T' but not the other direction T. Accordingly, the sprocket wheel 61 is free to rotate over 360° relative to the sprocket disc 62 in direction T', with the inner tooth 64 riding past the finger 66. In counter direction T, the tooth 64 will at some stage be caught by the finger 66, thereby restricting such counter rotation to within 360°.

The sprocket 60 is provided immediately above the exposure chamber 13. A horizontal slot 15 is formed through the back of the exposure chamber 13 above the rear opening 14 to let at least one of the outer teeth 63 of the sprocket wheel 61 protrude out for engaging a respective traction hole of the film strip 80 extending behind the chamber 13. The rear opening 14 is provided with a marker 15' below, which is vertically aligned with the centre of the slot 15. Upon movement by the film-advancing wheel 20, the film strip 80 rotates the sprocket wheel 61 in direction T, which in turn, by reason of the engagement between the inner tooth 64 and the finger 66, rotates the sprocket disc 62 in the same direction.

The cam 70 has, along its axis downwards, a circular disc portion 71 having a cutout 72, a cam portion 73 expanding radially in direction T' and having a radial step 74, and a square bottom end 75. The cutout 72 is formed, when viewed from above, immediately in front of the step 74 below. Through engagement of the bottom end 75 with the aperture 65, the cam 70 is co-axially rotatable by the sprocket disc 62 in the same direction (direction T). The cam portion 73 is arranged to be in side engagement with the third projection 53 of the striker 50 for, upon such rotation, turning the striker 50 in opposite direction T' against the spring 90 (FIG. 6). The cutout 72 permits locking of the disc portion 71 with the third projection 53 to stop the rotation of the sprocket 60, etc.

Reference is now made to FIGS. 5 to 7 of the drawings, showing the operating mechanism 40 in normal, intermediate and ready-to-shoot conditions, respectively. Starting from the normal condition (FIG. 5), the film-advancing wheel 20 is turned by a user to rotate, via the film strip 80, the sprocket wheel 61 and disc 62 (rotating together by reason of the aforesaid angular engagement between the inner tooth 64 and the finger 66) and in turn the cam 70, all in direction T (FIG. 6). As a result of the cam portion 73 pushing away the third projection 53, the striker 50 is simultaneously turned in opposite direction T' against the spring 90. All the rotation and turning actions stop automatically when the condition of FIG. 7 is reached, whereupon the film strip 80 has just been advanced for precisely one whole exposure frame. Also, the sprocket wheel 61 and disc 62 have just been rotated for a complete turn.

The following two events take place upon reaching of the ready-to-shoot condition. Firstly, the second projection 52 of the striker 50 moves in direction S' past the shutter plate end 34 and then horizontally beyond the hook 33. Secondly, immediately afterwards, the step 74 of the cam portion 73 rotates beyond the third projection 53 and allows it to move slightly inwards and then upwards, under the vertical action of the spring 90, to engage with the cutout 72 of the disc portion 71 in a locked condition corresponding to the ready-to-shoot condition, thereby locking against any further rotation of the cam 70 and sprocket 60 and hence film advancing. As a result, the torsional action of the spring 90 is now being retained by the cutout 72 catching the third projection 53.

In the condition of FIG. 7, the operating mechanism 40 is ready to be triggered by a user pressing down the striker 50 by the top end 50A, against the vertical action of the spring 90, to release the third projection 53 from the cutout 72. Upon such release, the striker 50 rotates rapidly back, returning in direction T, under the torsional action of the spring 90, to have the second projection 52 stroking the end 34 of the shutter plate in direction S, thereby causing the shutter plate to momentarily open the exposure aperture for photographic exposure. Whereupon, the operating mechanism 40 returns to the normal condition of FIG. 5.

FIG. 8 shows two film strips 80, specifically 80A and 80B, of the aforesaid 35 mm film roll, each of which has a front end including a side tongue 81 and a rear end including a central lug 82. The base film initially comes in the form of a large pan-roll, which is pre-exposed with various messages 83, such as "Happy Birthday" etc, for every standard frame width of eight traction holes, thereby defining respective exposure frames 84. Each message 83 occupies only the bottom part of the respective frame 84. A series of twenty-four (or thirty-six) such frames 84 is pre-exposed, which is repeated sequentially over the entire length of the base film. The beginning of each series of the frames 84 is cut with an index notch 85 at fifteen traction holes from the first frame 84'.

For formation, the film strips 80, each bearing one whole series of the pre-exposed frames 84, are cut out by means of a cutter (not shown) from the base film, with reference to the respective index notches 85. Such a cutter forms respective front tongue 81 and rear lug 82 between adjacent film strips 80 in a single cutting action. By reason of an inevitable production inaccuracy in the pre-exposure separation between successive series of the frames 84, each film strip 80 may be cut have a slightly different length towards the rear lug 82, as shown between the film strips 80A and 80B.

For use, the rear lug 82 of the film strip 80 is anchored to the spool of the aforesaid 35 mm film cartridge and the film strip 80 is then wound onto the spool until almost fully into the cartridge. The cartridge is subsequently placed inside the film take-up chamber 12. The film strip 80 is then pulled out, with the front tongue 81 first, to 15 extend across the rear opening 14 of the exposure chamber 13. While inside the closed camera body 11, the film strip 80 is finally wound onto the spool of the film supply chamber 16 until it stops, becoming tensioned on the anchoring of the inside rear lug 82. Ideally, the last 20 frame 84" should be in accurate alignment with the exposure chamber 13, ready for the exposure of a first photographic image.

The alignment of the last frame 84", and accordingly all the other frames 84, with the exposure chamber 13 must be achieved accurately, otherwise the exposed photographic images will be shifted from the respective pre-exposed messages 83. Such an accurate alignment cannot always be achieved by reason of the aforesaid variation in the length of the film strip 80 towards the rear lug 82, because the position of the rear lug 82 determines where the film strip 80 stops unwinding out of the cartridge.

This mis-alignment problem is solved by the construction of the sprocket 60 described above, in which the sprocket wheel 61 is angularly engageable in only one direction with the sprocket disc 62 and at a single relative orientation, as between the inner tooth 64 of the former and the finger 66 of the latter.

For this purpose, the following actions are to be taken before the film strip 80 is unwound from the film cartridge of the film take-up chamber 12 for winding onto the spool of the film supply chamber 16. Reference is made to FIG. 9. Firstly, the sprocket wheel 61 is rotated carefully in direction T from the back by a thumb until the aforesaid locked/ready-to-shoot condition is reached, with the marked tooth 63' protruding out through the centre of the back slot 15. Secondly, while the bottom traction hole of front end of the film strip 80 nearest to the index notch 85 is aligned with the marker 15', the corresponding top traction hole is engaged with the protruding marked tooth 63', with the front tongue 81 reaching the spool of the film supply chamber 16. Once these actions are taken, the spool is rotated at high speed to wind the film strip 80 into the film supply chamber 16 from the film cartridge. During this film winding action, the sprocket wheel 62 is rotated in direction T' by the moving film strip 80, with the inner tooth 64 slipping cyclically past the finger 66 of the sprocket disc 62 which thus remains stationary.

If the film strip 80 has the exact pre-determined length, the film winding action will stop, resulting in a desired condition in which the last exposure frame 84" is in accurate alignment with the exposure chamber 13 and the inner tooth 64 of the sprocket wheel 61 reaches an angular position immediately engageable with (in direction T) and in front of the finger 66 of the sprocket disc 62. In this desired condition, the camera 10 is ready for a user to take photographs from the last frame 84" backwards, with perfect alignment with respective pre-exposed messages 83.

If the length of the film strip 80 is shorter or longer than the pre-determined length, the last frame 84" will not stop in accurate alignment with the exposure chamber 13, being mis-aligned for less than a whole frame width (eight traction holes) such as four traction holes (not necessarily an integral number of holes). At the same time, the inner tooth 64 of the sprocket wheel 61 will be out of angular alignment with the finger 66 of the sprocket disc 62 for, correspondingly, four outer teeth 63.

In order to achieve the aforesaid desired condition, the sprocket wheel 61 is rotated back in direction T carefully, for example by means of the film-advancing wheel 20 via the film strip 80 as in normal film advancing, until the inner tooth 64 just reaches the last possible angular position immediately engageable with (in direction T) and in front of the finger 66 of the sprocket disc 62. At this time, the last frame 84" (for a longer film strip 80) or the second last frame (for a shorter film strip 80) will, accordingly, be in accurate alignment with the exposure chamber 13. The reaching of the desired condition is indicated by a clicking sound which is caused by the inner tooth 64 riding just past the finger 66 and snapping immediately in front of the finger 66. At such time, the camera 10 is ready for use.

FIG. 10 shows the wheel 61 and disc 62 of the sprocket 60 in five different relative angular positions. The inner tooth 64 of the sprocket wheel 61 occupies a mere angle of about 10° with respect to the centre (the uppermost view), leaving the remaining angle of about 350° free for the sprocket wheel 61 to rotate in direction T relative to the sprocket disc 62. Accordingly, such an angular range of free rotation allows for any mis-alignment of the last frame 84" from the exposure chamber 13, upon the stopping of the aforesaid winding action of the film strip 80 out of the film cartridge, up to 350°/360° or 97% of a whole frame width that may be caused by the unintended length variation of the film strip 80.

The invention has been given by way of example only, and various modifications of and/or alterations to the described embodiment may be made by persons skilled in the art without departing from the scope of the invention as specified in the appended claims.

What is claimed is:

1. A disposable camera having a body which provides a film take-up chamber for containing an initially empty film cartridge, an exposure chamber having an open rear side, and a film supply chamber for containing a film roll pre-exposed with messages on respective frames for subsequent photographic exposure, and including a shutter mechanism to enable photographic exposure, a film-advancing member for moving the film from the film supply chamber to the film take-up chamber across the rear side of the exposure chamber, and an operating mechanism which includes a sprocket for engaging traction holes of the film extending across the rear side of the exposure chamber for activating the overall operating mechanism upon said movement of the film, wherein the sprocket is formed by an external toothed wheel and an internal member which are co-axially rotatable relative to each other and provided with respective formations which are angularly engageable with each other in only one direction and at a single relative orientation between said wheel and member.

2. A disposable camera as claimed in claim 1, wherein the formation of the sprocket wheel is in the form of a projection for engaging with the formation of the sprocket member in said only one direction.

3. A disposable camera as claimed in claim 1 or claim 2, wherein the formation of the sprocket member is resiliently biassed to engage with the formation of the sprocket wheel in said only one direction.

4. A disposable camera as claimed in claim 2, wherein the formation of the sprocket wheel is in the form of an asymmetrical triangular tooth.

5. A disposable camera as claimed in claim 3, wherein the formation of the sprocket member is in the form of an arcuate peripheral finger.

6. A disposable camera as claimed in claim 1, wherein the sprocket member is substantially in the form of a disc.

7. A disposable camera as claimed in claim 1, wherein the formation of the sprocket wheel is provided to extend for an approximate angle of 10° with respect to the centre.

* * * * *